Aug. 13, 1940.    H. L. BONE ET AL    2,211,554
SPEED RESPONSIVE DEVICE
Filed April 30, 1938    5 Sheets-Sheet 1

Fig. 1.

INVENTORS
Herbert L. Bone and
John W. Livingston.
BY
THEIR ATTORNEY

Aug. 13, 1940.  H. L. BONE ET AL  2,211,554
SPEED RESPONSIVE DEVICE
Filed April 30, 1938   5 Sheets-Sheet 5

INVENTORS
Herbert L. Bone and
John W. Livingston.
BY
THEIR ATTORNEY

Patented Aug. 13, 1940

2,211,554

UNITED STATES PATENT OFFICE 2,211,554

SPEED RESPONSIVE DEVICE

Herbert L. Bone and John W. Livingston, Forest Hills, Pa., assignors to The Union Switch & Signal Company, Swissvale, Pa., a corporation of Pennsylvania Application April 30, 1938, Serial No. 205,276

29 Claims. (Cl. 200—80)

Our invention relates to speed responsive devices, and particularly to speed governors which are adapted for use on high speed trains either in connection with automatic train control equipment to limit the speed at which the trains may operate under certain conditions, or in connection with the air brake system to enable the braking force exerted by the brakes to be varied in accordance with the train speed, whereby maximum brake efficiency may be obtained and a smooth stopping action may be effected.

Another object of our invention is to provide a governor of the type described which is sufficiently light in weight and small in size to enable it to be readily mounted on the end of an axle of modern streamline trains.

A further object of our invention is to provide a governor of the type described which permits of a relatively large number of contact combinations, and which can be used on either passenger or freight trains.

Other objects and characteristic features of our invention will appear as the description proceeds.

Governors embodying our invention are an improvement on the governor disclosed and claimed in Letters Patent of the United States No. 1,878,305, granted to Per Utne on September 20, 1932, for Speed responsive device.

We shall describe several forms of governors embodying our invention, and shall then point out the novel features thereof in claims.

In the accompanying drawings

Similar reference characters refer to similar parts in each of the several views.

Referring first to Figs. 1 to 4, inclusive, the governor in the form here shown comprises a suitable housing 1 which encloses all of the operating parts of the governor, and which housing is adapted to be secured, in any suitable manner not shown, to the journal box of a railway vehicle adjacent one end of one of the axles 2 of the vehicle. In keeping with modern tendencies to reduce weight to a minimum, it is desirable that the housing should be as light as possible, and to this end the housing is preferably in the form of a single unit heat treated alloy casting provided with such openings as are necessary or desirable to permit ready assembling of the parts and subsequent access to them for inspection, maintenance or repair. The housing openings are all closed by suitable cover plates or otherwise, as will appear from an inspection of the drawings, to prevent the introduction of dirt, moisture or other foreign substances, and to retain within the housing the necessary lubricants.

The interior of the housing 1 is divided by means of suitable partition walls into two compartments 3 and 4, and rotatably mounted in the lower part of the compartment 3 in axial alignment with the axle 2 by means of roller bearings 5 is a helical gear 6. This gear is driven by the axle 2 through the medium of a flexible coupling which we shall describe presently, and meshes with a helical gear 7 secured to a member B comprising part of a centrifuge device.

The member B is rotatably mounted in the compartment 3 in a vertical position at one side of the helical gear 6 by means of suitable anti-friction bearings, here shown as a roller bearing 8 and a ball bearing 9, and comprises two spaced longitudinally aligned tubular spring housings 10 and 11 connected together by two integral transversely spaced parallel side plates 12. The confronting ends of the spring housings are provided with inwardly extending annular flanges 10a and 11a which form openings 10b and 11b, respectively, and extending with some clearance through the opening 10b into the housing 10 is a rod 13, the lower end of which is provided with what may be termed a piston 14, and the upper end of which is secured to a link head 15. A rod 16 similarly extends with some clearance through the opening 11b into the housing 11, and is provided at its upper end with a cup shaped piston 17, and is secured at its lower end to a link head 18. A coil spring 19 surrounds the rod 13 between the piston 14 and the flange 10a, and biases this rod to a lower position in which the link head 15 engages the flange 10a, and a coil spring 20 similarly surrounds the rod 16 between the piston 17 and the flange 11a and biases this latter rod to an upper position in which the link head 18 engages the flange 11a. The side plates 12 of the member B support a transversely extending shaft 21 which is located at equal distances from the two spring housings 11 and 12 and which passes through the axis of the member B at right angles thereto, and mounted on this shaft are two crossed centrifuge arms 22 and 23, each arm, as here shown, being made up of two parallel members. One end of each centrifuge arm 22 and 23 is pivotally connected by means of links 24 and 25 with the link head 18, and the other end of each centrifuge arm is pivotally connected by means of links 27 and 28 with the link head 15.

It will be seen, therefore, that when the member B is rotated the resulting centrifugal force will tend to move the centrifuge arms into a common plane which is perpendicular to the vertical axis of the member B, and that the springs 19 and 20 will exert opposite forces on the centrifuge arms in opposition to this centrifugal force. In other words, as the speed of rotation of the member B increases, the two pistons 14 and 17 will move toward each other, and as the speed of rotation of the member B decreases, these two pistons will move away from each other.

Figure 1:
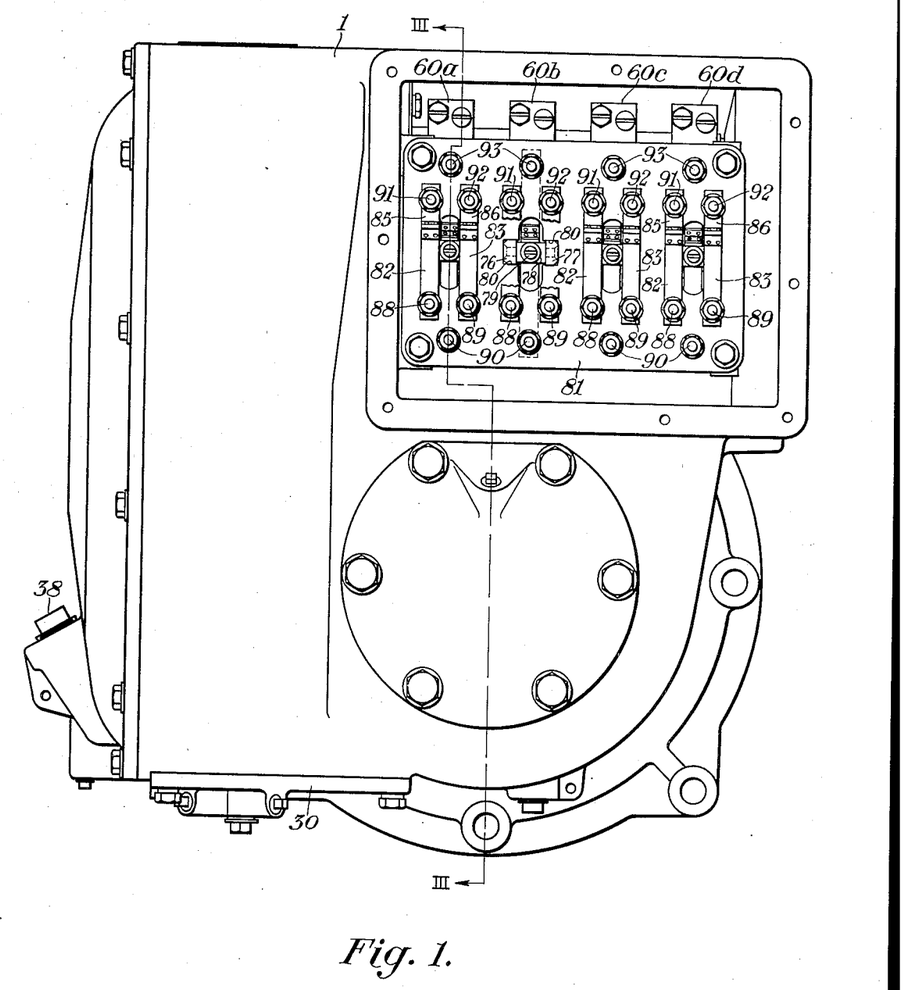
Fig. 1 is a front elevational view of a governor embodying our invention with one of the covers removed to illustrate the contact structure of the governor.
Figure 2:
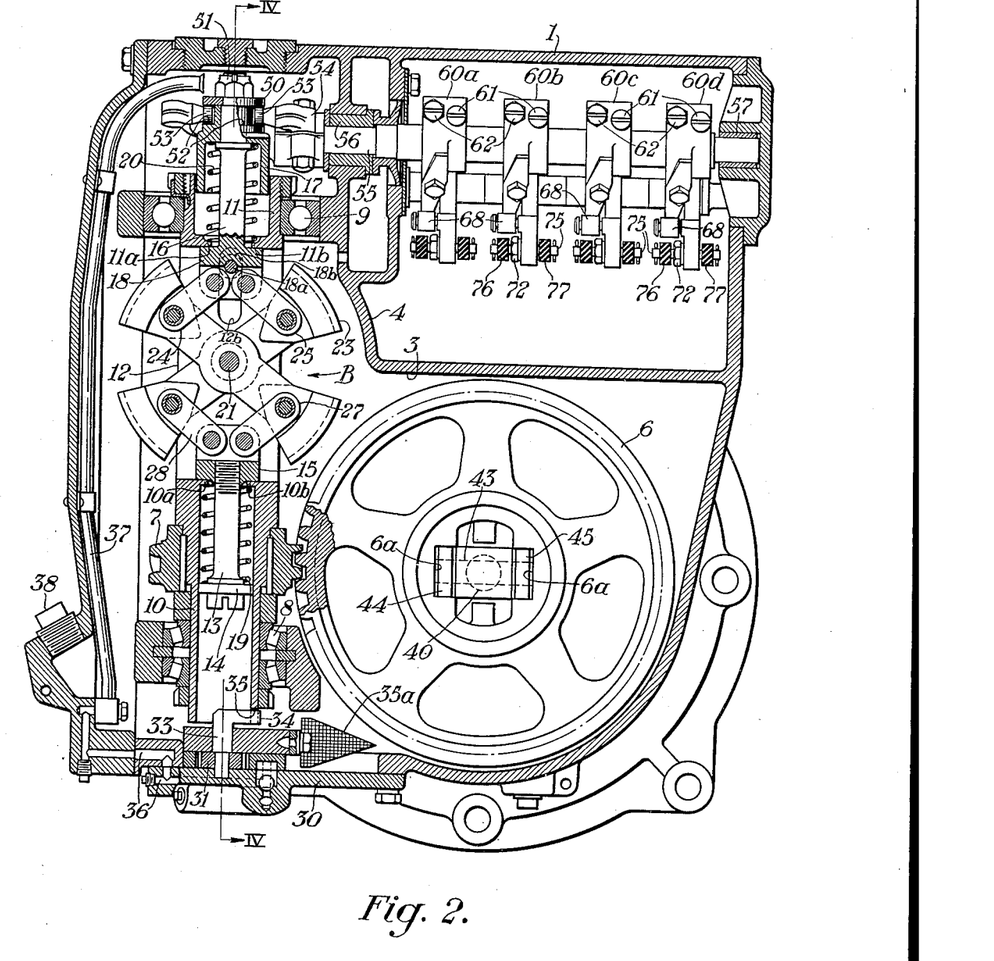
Fig. 2 is a vertical longitudinal sectional view of the governor shown in Fig. 1.

To prevent wear, it is necessary to provide adequate lubrication, and to this end the lower part of the compartment 3 is intended to contain a quantity of oil, and an oil pump is provided to circulate this oil. The oil pump is mounted on a plate 30 secured to the bottom of the housing 1 and comprises two intermeshing gears 31 and 32. The gear 31 is secured to a vertical shaft 33 which is provided at its upper end with an arm 34 that projects into a slot 35 formed in the lower end of the housing 10, whereby this gear is operatively connected with the member B. The oil pumped by the oil pump is drawn through a strainer 35a and is forced through discharge passages 36 into a pipe 37 which extends to the top of the member B. The pipe 37 is provided with a plurality of holes (not shown) which are disposed opposite the centrifuge arms 22 and 23, and is open at its upper end, and it will be seen therefore that when the member B is rotated, oil will be continually supplied to all of the moving parts. To permit the insertion of oil into the compartment 3, a plug 38 is provided, as best seen in Fig. 2.

The oil in compartment 3 is prevented from leaking out of this compartment past the bearings 5 in which the gear 6 is journaled by suitable oil retainers 5a of the usual and well-known construction.

Figure 3:
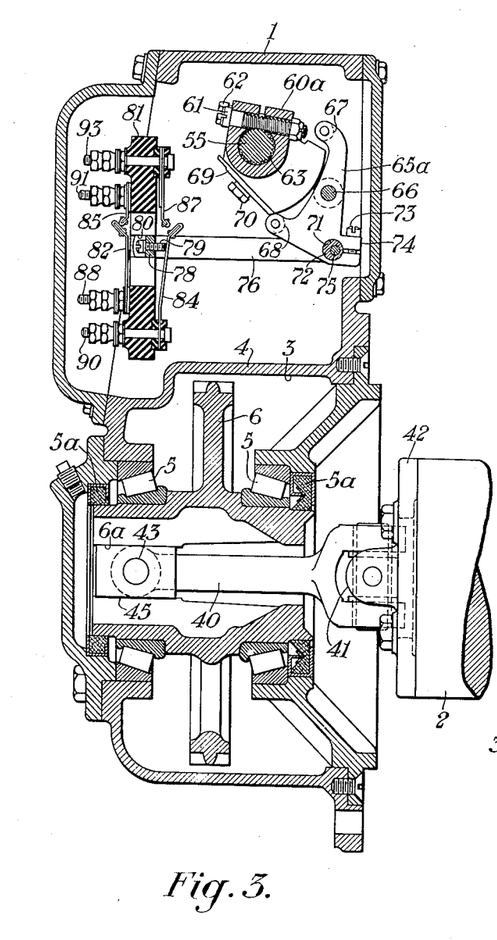
Figs. 3 and 4 are sectional views taken substantially on the lines III—III and IV—IV, respectively, of Figs. 1 and 2.
Figure 4:
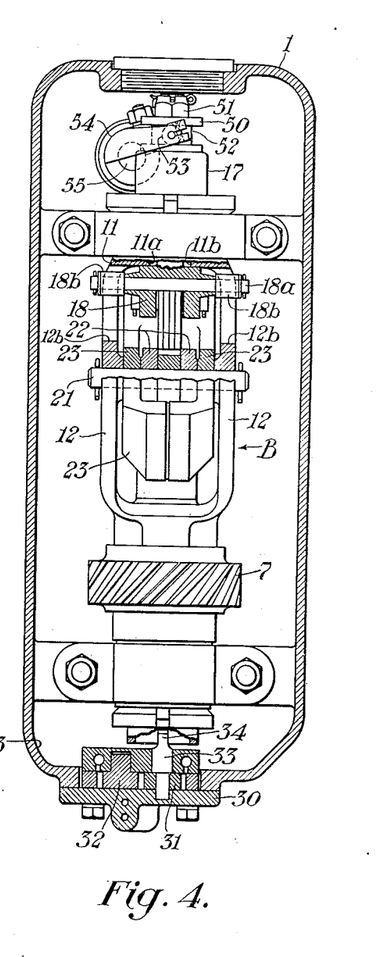

The flexible coupling for driving the gear 6 from the axle 2 in the form shown in Fig. 3 is designed primarily for use when the bearings in which the axle 2 is mounted are of the type employing journal brasses, and comprises a drive shaft 40 one end of which is secured by means of a universal joint 41 of the usual and well-known type to a plate 42 which is bolted to the end of the axle 2. The other end of the drive shaft 40 extends with considerable clearance into an opening formed in the hub of the gear 6 and has secured to its opposite sides by means of a wrist pin 43 two cross head blocks 44 and 45. These cross head blocks are slidably mounted in slots 6a provided in the opposite sides of the hub of the gear 6, and as best seen in Fig. 2 are tapered outwardly from their centers toward their outer ends in such manner that they are thinner at their outer ends, whereby the inner end of the drive shaft is free to move longitudinally with respect to the gear wheel and also to rock in both directions from the position in which its axis is parallel to the axis of the gear, but that the gear will be constrained to rotate in response to rotation of the axle 2.

One advantage of the coupling just described is that it enables the axle to shift longitudinally a distance equal to that permitted by the usual clearances which are provided between the axle shoulder and the journal brasses, and also to shift vertically from the position in which its axis aligns with the gear wheel the maximum amount which will be encountered in practice due to journal wear, etc. without producing objectionable strains on the gear or the housing.

The piston 17 of the centrifuge device is provided at its upper end with a reduced portion which, together with a washer 50 which is clamped against this reduced portion by means of a castellated nut 51, forms an annular groove 52, and extending into this groove at diametrically opposite points are two rollers 53 mounted on a crank arm 54. The crank arm 54 is secured to one end of a cam shaft 55 which is journaled in bushed bearings 56 and 57 for oscillation about an axis perpendicular to the longitudinal axis of the member B, and it will be apparent therefore that the cam shaft 55 will be rotated in one direction in response to an increase in the speed of rotation of the member B, and in the opposite direction in response to a decrease in the speed of rotation of the member B.

Mounted on the cam shaft 55 are a plurality of contact controlling cam segments, here shown as four in number, and designated by the reference characters 60a, 60b, 60c and 60d, respectively. Each of these segments operates a group of contacts in a manner which will be made clear presently, and in order to permit these contacts to be selectively operated at any desired car speed it is desirable to be able to readily adjust the angular position which each segment occupies with respect to the shaft. To this end, the hub of each segment is split and has mounted therein two screws 61 and 62. The one screw 61 serves as a worm to rotate the segment to different positions and meshes with worm teeth 63 cut in a groove formed in the cam shaft, while the other screw 62 serves as a means to draw the split portion of the hub together and thus clamp the segment in its adjusted position. It will be seen therefore that if it is desired to change the angular position of any cam segment with respect to the shaft, this may be quickly and conveniently done by first loosening the clamping screw, then rotating the adjusting screw in one direction or the other until the segment is moved to the desired position, and then again tightening the clamping screw.

Associated with each cam segment is a rocker designated by the reference character 65 with a distinguishing suffix corresponding to that of the reference character for the segment. These rockers are journaled on a rod 66 which extends parallel to the cam shaft, and are each provided with a pair of rollers 67 and 68 one or the other of which is adapted to at times ride up onto the cam segment to rotate the rocker in one direction or the other. The rollers are spaced apart a distance which is somewhat greater than the lengths of the cam segments, and the angular travel of the cams between the two positions at which the rollers ride up onto the cam segments is made adjustable to two different positions by means of plates 69, one of which is secured to the lower side at each segment by means of a machine screw 70. The two ends of each cam plate have different thicknesses, and the parts are so proportioned that the plates may be turned end for end and that in either position of the plates the lower or outer end, as viewed in Fig. 3, will be flush with and form a continuation of the arc of the segment.

Disposed in an opening 71 provided at the lower end of each rocker is an eccentric bushing 72 which may be clamped in an adjusted position by means of a clamping screw 73 mounted in a split portion 74 of the rocker adjacent the opening 71, and secured to the rocker by means of a pin 75 passing through this bushing are two insulating push rods 76 and 77. These push rods are secured together at their outer end by means of a cross piece 78 which carries a screw 79, and are slidably supported in openings 80 formed in an insulating panel 81 which supports the contacts of the governor. These contacts are arranged in four groups, one for each cam, and each group comprises three flexible contact fingers 82, 83 and 84 which cooperate with fixed contact members 85, 86 and 87, respectively, to form contacts 82—85, 83—86 and 84—87. The flexible contact fingers 82 and 83 are secured at their lower ends to the forward side of the panel 81 by means of terminal posts 88 and 89, and cooperate intermediate their ends with the forward ends of the associated push rods 76 and 77, respectively, while the finger 84 is secured at its lower end to the rear side of the panel midway between the associated fingers by means of a terminal post 90, and cooperates intermediate its ends with the inner end of the associated screw 79. The fixed contact members 85 and 86 are secured to the forward side of the panel above the associated contact fingers 82 and 83 by means of terminal posts 91 and 92, and the fixed contact member 87 is secured to the rear side of the panel above the finger 84 by means of a terminal post 93.

The contact fingers are biased by their own resiliency to the positions in which the contacts are all closed, and the parts are so adjusted that when the cam segment associated with any group of contacts occupies a position in which both rollers of the rocker controlled thereby are out of engagement with the cam segment, the rocker will be forced to move due to the bias of the contact fingers to a mid position in which the contacts of the group will all be closed, but that when the cam segment asssociated with any group of contacts is rotated in a counterclockwise direction, as viewed in Fig. 3, to the position in which the roller 67 of the associated rocker rides up onto the cam, the associated push rods 76 and 77 will engage the associated fingers 82 and 83 and move them to the positions in which the contacts 82—85 and 83—86 controlled thereby are open, and that when the cam segment is rotated in a clockwise direction to the position in which the associated roller 68 rides up onto the cam, the associated screw 79 will then engage the finger 84 and move this finger to the position in which the contact 84—87 is open. In adjusting the contacts of any group, the cam shaft 55 is first rotated to the position in which the cam segment 60 which controls the contacts is just clear of the upper roller 67, and the plate 69 secured to the segment is then turned to the position which will cause the other roller 68 to just clear this cam segment, thus insuring that the parts will not bind due to manufacturing variations and the like. The cam shaft is next rotated in a counterclockwise direction, as viewed in Fig. 3, to a position in which the roller 67 rides up onto the cam segment and the locking screw 73 is then loosened and the eccentric bushing 72 is rotated to the position in which the fingers 82 and 83 are moved out of engagement with the associated fixed contact members 85 and 86 by the push rods 76 and 77 an amount which will give the maximum desired contact opening, after which the bushing 72 is then clamped in its adjusted position by again tightening the screw 73. The governor is then placed in a testing machine and rotated at the speed which it is desired to have the contacts 82—85 and 83—86 of the group open, and the cam segment is then adjusted on the cam shaft in the manner previously described to a position which will just cause the roller 67 to ride up onto the cam segment and open the contacts. The speed of the governor is then decreased to a speed below the speed at which it is desired to have the contact 84—87 of the group open, and is then increased to the value at which the contacts should open with increase in speed, whereupon shims are placed under the head of the screw 79 of such thickness that when the head of the screw is tight against the shims the finger 84 will just touch the asssociated contact member 87. In actual practice, the contact 84—87 of each group will usually be so adjusted that it will open at about one mile per hour less than the speed at which the associated contacts 82—85 and 83—86 open, and the four groups of contacts will be so adjusted that they will operate at four different speeds, although almost any desired contact combination can be obtained. If it is desired to increase the difference between the speed at which the contacts 84—87 and the contacts 82—85 and 83—86 open, this may be done by providing a plate 69 which will increase the angular difference between the two positions of the cam shaft in which the rollers 67 and 68 ride up onto the associated cam segment, or by removing the plate 69 entirely, or by decreasing the length of the cam segment.

Referring now to Figs. 5 to 8, inclusive, in the modified form of contact mechanism here shown, the cam shaft 55 is provided with four cam segments 180a, 180b, 180c and 180d which may be secured to the cam shaft in the same manner as the previously described cam segments 60a, 60b, 60c and 60d, respectively, and which are similar to these cam segments except for the fact that they are not provided with adjusting plates. The cam segments cooperate respectively with rollers 181a, 181b, 181c and 181d provided on rockers 182a, 182b, 182c and 182d. The rockers are pivoted at their upper ends on pins 183a, 183b, 183c and 183d mounted in bifurcated supports 184a, 184b, 184c and 184d secured by means of screws 185, in the manner shown in connection with the rocker 182c in Fig. 6, to a bracket 186, and the bracket 186 in turn is secured to the housing 1 within the compartment 4 by means of studs 187, which studs also serve to secure an insulating panel 188 to the bracket. Interposed between each support and the bracket are one or more shims 189, the function of which will be made clear presently. The lower end of each rocker is pivotally attached to a push rod assembly 190, the free ends of which are slidably supported in openings 191 formed in the panel 188. The push rod assembly is of moulded insulating material and comprises a pair of push rods which are provided intermediate their ends with confronting bosses, and which are clamped together at the bosses by bolts 192 to form an H-shaped structure having a central arm or cross bar 190a. The cross bar on the side facing the rocker cooperates with a depending stop arm 193 formed on the bracket 186, and interposed between each rocker and the associated stop arm is a coil spring 194 which constantly biases the rocker to the position in which the cross bar engages the stop arm. The other side of each cross bar cooperates with a flexible contact finger 195 disposed on the rear side of the panel, while the outer ends of the push rod assembly cooperate with flexible contact fingers 196 and 197 disposed on the forward side of the panel. The finger 195 is secured to the panel at its upper end by means of a terminal post 198 and cooperates at its lower end with a relatively stiff contact finger 199 to form a contact 195—199. The finger 199 in turn is clamped at its lower end between two metal blocks 200 and 201 which are secured to the panel 188 by means of a terminal post 202, and is pierced adjacent its upper end to receive with some clearance an adjusting screw 203. The screw 203 is mounted in a threaded opening provided in an upstanding projection formed on the outer block 201, and carries a pair of lock washers 204 and a lock nut 205 disposed on the side of the projection opposite the finger 199. The nut 205 is prevented from rotating by a slotted leaf spring lock 205a which straddles the nut (see Fig. 8) and which is riveted to the projection. It will be apparent that by pushing the upper end of the leaf spring lock inwardly to the point in which the slot is clear of the nut the nut can be turned, and the nut is so adjusted that it will produce sufficient friction on the threads of the screw 203 to cause the screw to remain at any position to which it is adjusted. It will be obvious, of course, that by adjusting the screw the position of the finger 199 can be varied, thus providing a convenient means for adjusting the position of the rocker at which the contact 195—199 opens, as will be pointed out somewhat more fully hereinafter.

Figure 5:
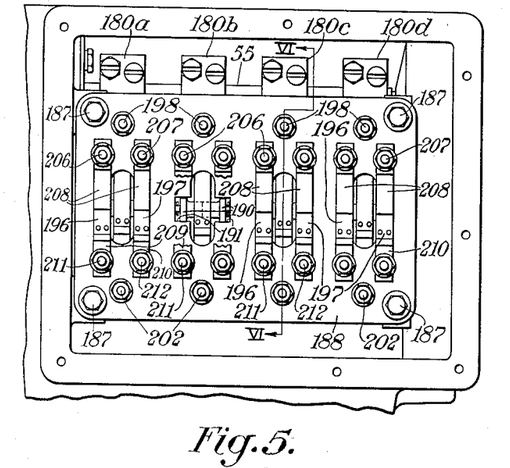
Fig. 5 is a plan view showing a modified form of contact structure which may be used in the governor in place of that shown in the preceding views.
Figures 6, 7:
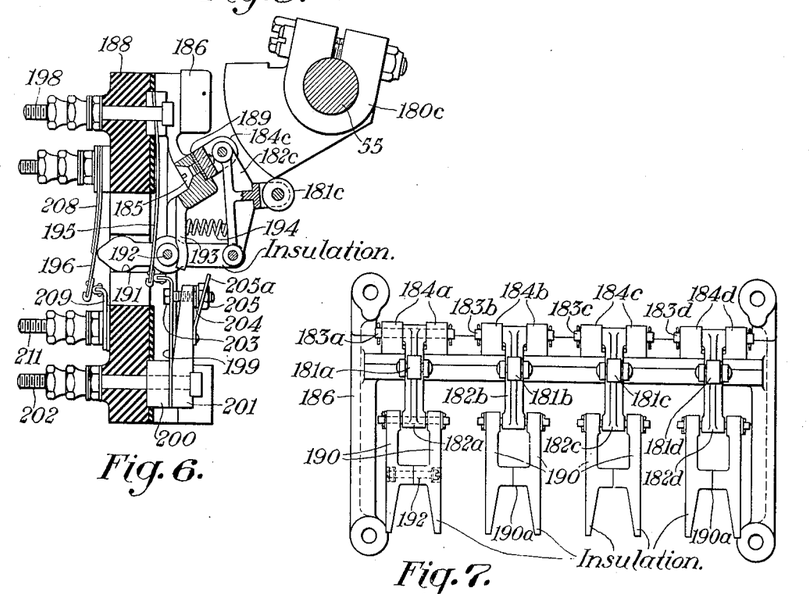
Fig. 6 is a sectional view taken substantially on the line VI—VI of Fig. 5.
Fig. 7 is a detail view showing a portion of the mechanism illustrated in Figs. 5 and 6.
Figure 8:
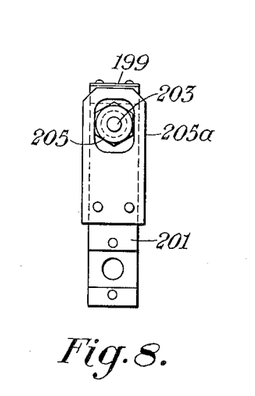
Fig. 8 is a view of the block 201 and associated parts as they appear when viewed from the right in Fig. 6.
Figure 9:
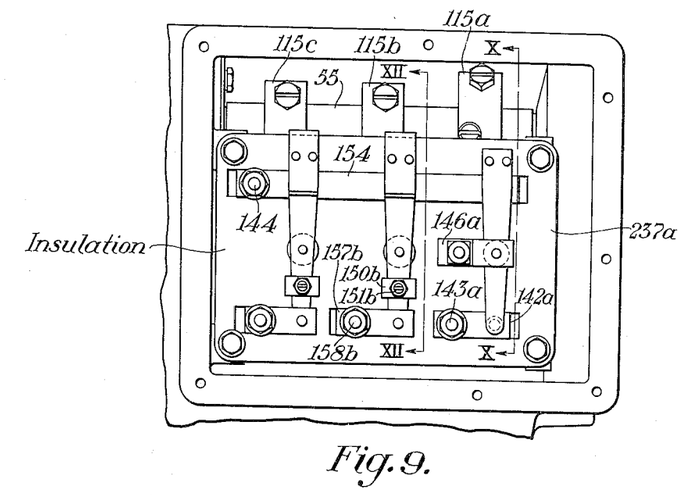
Fig. 9 is a plan view showing another form of contact structure which may be used in the governor in place of that shown in the preceding views.

The flexible fingers 196 and 197 are secured at their upper ends to the panel 188 by means of terminal posts 206 and 207, and clamped against the forward face of each finger is a leaf spring 208 the length of which is such that its lower end is disposed approximately opposite the point at which the associated push rod engages it. The lower ends of the flexible fingers 196 and 197 cooperate with fixed contact members 209 and 210 to form contacts 196—209 and 197—210, respectively, the fixed contact member being secured to the panel by means of suitable terminal posts 211 and 212.

The flexible contact fingers are biased by their own resiliency to the positions in which the associated contacts are all closed, and the parts are so proportioned that when the roller carried by any rocker is out of engagement with the associated cam segment the associated contacts will all be closed, but that when the roller carried by any rocker is engaging the face of the cam segment the contacts will all be open. The parts will usually be further so proportioned that the four groups of contacts will be operated at four different vehicle speeds.

In adjusting the contacts of any group, the cam shaft 55 is first rotated to the position in which the roller on the associated rocker is clear of the associated cam, and the associated depending stop arm 193 is bent to such a position that when the cross bar 190 of the associated push rod assembly is engaging the stop the ends of the push rod assembly will clear the fingers 196 and 197 to permit the fingers to engage the associated fixed contact member. The shaft 55 is then rotated to the position in which the roller on the rocker is riding on the face of the cam segment, and shims 189 are inserted between the rocker support 184 and the frame 186. These shims have the necessary thickness to cause the push rod assembly to move the fingers away from the associated fixed contact members a sufficient distance to provide the desired front contact openings. The screw 203 is next so adjusted that as the roller rides up onto the cam the contact 195—199 will open at a speed of approximately one mile per hour below the speed at which the other contacts open. It should be noted that during this latter adjustment if the finger 199 is moved toward the right the finger 195 will tend to follow it, and since the distance between the tip of the push rod assembly and the cross bar of the push rod assembly is fixed, the distance moved by the push rod assembly between the point at which the contact 195—199 and the contacts 196—209 and 197—210 open is varied.

It should be pointed out that in order to be able to readily obtain the last mentioned adjustment it is necessary that the number of turns of the screw 203 required to cause a difference of one mile per hour between the opening of the contact 195—199 and the contacts 196—209 and 197—210 of any group should be at least two or three, and we have found that the manner in which the finger 195 and the fingers 196 and 197 flex when they are being moved in the direction to open the contact has a marked effect on this adjustment. We have also found that the proper flexing of the fingers 196 and 197 to obtain the desired adjustment can best be obtained by providing the leaf springs 208 to control the flexing of these fingers. With this arrangement, the fingers 196 and 197 begin to exert pressure against the push rod assembly before the associated contact 195—199 opens, and by the time the contact 195—199 is almost open most of the load due to the fingers 196 and 197 has been transferred to the push rod assembly, so that only a slight increase in governor speed is necessary to move the cam sufficiently to open the contacts 196—209 and 197—210. The fingers 196 and 197 are quite flexible, and as a result the motion of the push rod assembly required to move the fingers 196 and 197 from the position in which the associated contacts are fully closed to the position in which the contacts just open is rather long, and the point in this travel at which motion of the push rod assembly causes the contact 195—199 to open can be varied quite accurately by adjustment of the screw 203.

One advantage of a governor constructed in accordance with our invention resides in the fact that the centrifuge and the contact mechanism are nested around the axle of the vehicle in a manner which enables the size of the governor to be made as small as possible.

Another advantage of a governor constructed in accordance with our invention is that it is relatively small in size and light in weight.

Figures 10, 11, 12, 13:
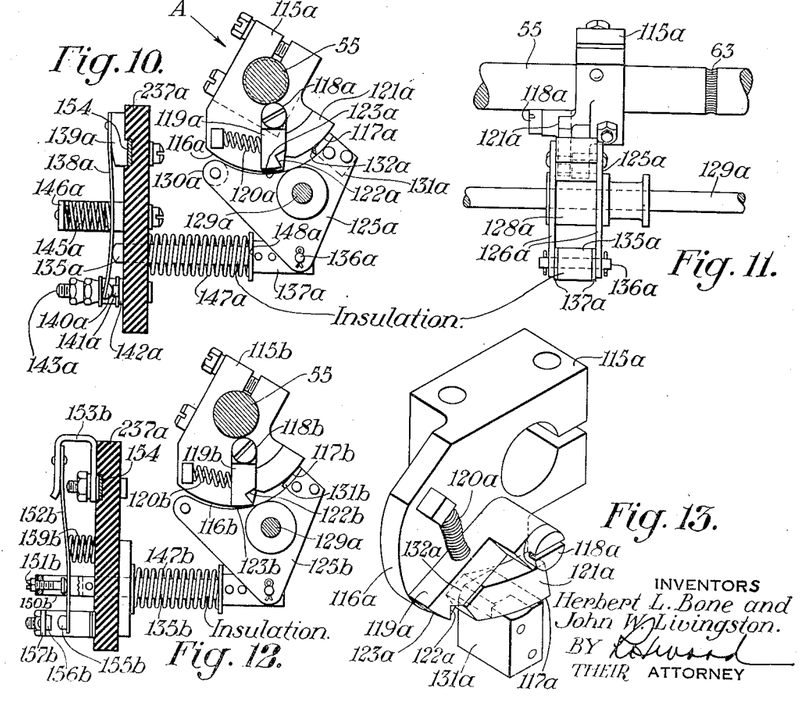
Fig. 10 is a sectional view taken on the line X—X of Fig. 9.
Fig. 11 is a view looking toward the left in Fig. 9.
Fig. 12 is a sectional view taken on the line XII—XII of Fig. 9.
Fig. 13 is an isometric view of a portion of the cam segment and associated cam follower shown in Fig. 10 looking in the direction of the arrow A in Fig. 10.

The governor when provided with either form of contact mechanism previously described is particularly suitable for use in connection with a train control system in which it is desired to impose four speed limits on the train depending upon traffic conditions or the presence of permanent track hazards in advance. When it is desired to use the governor in connection with high speed train brake systems only three contacts are necessary, namely, a first contact which opens at a relatively high speed, a second contact which opens at a medium speed, and a third contact which closes at a low speed, and inasmuch as these contacts are utilized to control highly inductive circuits it is desirable that these contacts should be heavy duty contacts and should operate with a snap action. It follows therefore that when the governor is to be used in connection with high speed train brake systems it is desirable to provide the governor with a different type of contact mechanism from that previously described, and in Figs. 9 to 13, inclusive, we have shown one form of contact mechanism which is suitable for this latter type of service. Referring to Figs. 9 to 13, inclusive, as here shown, the cam shaft 55 is provided with a low speed cam segment 115a, a medium speed cam segment 115b, and a high speed cam segment 115c, all of which cam segments are adjustably secured to the cam shaft in a manner similar to that in which the cam segments shown in Figs. 2, 3 and 4 are secured to the cam shaft. The cam segments 115a, 115b and 115c are similar, and the corresponding parts of each are designated by the same reference characters with suitable distinguishing suffixes. Referring particularly to the cam segment 115a, this cam segment is provided with a cam surface 116a and a stop surface 117a, the two surfaces being offset laterally and angularly with respect to each other as best seen in Figs. 10 and 13. Pivotally attached to the cam segment 115a by means of a screw 118a is a latch 119a, the function of which will be made clear presently. This latch is biased by means of a spring 120a to a position in which it engages a stop lug 121a formed on the cam, and is provided in one edge with a notch 122a. The lower end 123a of the latch is provided with substantially the same radius of curvature as the cam surface 118a, and the parts are so proportioned that when the latch occupies the position to which it is biased by the spring 120a the end 123a will be substantially parallel to the adjacent portion of the cam surface.

Associated with each cam segment is a rocker designated by the reference character 125 with a distinguishing suffix. Referring particularly to the rocker 125a, this rocker comprises a pair of plates 126a secured in parallel spaced relation to a hub 128a which is journaled on a rocker shaft 129a. The plates are also secured together adjacent one corner by means of a spacing member 130a, and have the edges on the side which is nearest the cam segment rounded to substantially the same radius of curvature as the radius of the cam surface to permit the rocker to be disposed close to the cam segment. Mounted between the plates 126a is a cam follower 131a which, as here shown, is in the form of a rectangular block having a portion 132a of its surface beveled in the manner shown. This cam follower cooperates with the cam segment 115a and with the latch in a manner which will appear presently. An insulating rod 135a is pivotally attached to the rocker 125a by means of a pin 136a which passes through the plates 126a and through two wear plates 137a which are riveted to the opposite sides of the rod 135a, and the outer or free end of this rod extends with some clearance through a hole formed in an insulating panel 237a and cooperates with a flexible contact finger 138a comprising the low speed contact of the governor. The finger 138a is secured at its upper end to a metal member 139a which is mounted on the panel, and is provided at its lower end with a low resistance contact 140a which cooperates with a contact button 141a secured to a metal bracket 142a which is attached to the panel by means of a terminal post 143a. The member 139a engages a metal strip or bus bar 154 which is secured at one end to the panel by means of a terminal post 144, and it follows therefore that electrical connection with the low speed contact may be conveniently made through the medium of the two terminal posts 143a and 144. The finger 138a is biased to a position in which the contact buttons 140a and 141a are in engagement by means of a compressed coil spring 145a disposed between the finger intermediate its end and a bracket 146a secured to the panel. The rocker 125 is biased to the position in which the cam follower 131a constantly engages the cam surfaces 116a or the stop surface 117a by means of a coil spring 147a which surrounds the rod 135a between the rear face of the panel and a washer 148a which abuts against the outer end of the wear plates 137a, and the parts are so proportioned that when the cam follower is engaging the stop surface 117a the low speed contact will be closed and the outer end of the push rod 135a will clear finger 138a by a slight amount, but that when the cam follower engages the cam surface 116a the finger will be moved by the rod to the position in which the low speed contact is open.

An insulating rod 135b (see Fig. 12) is pivotally attached to the rocker 125b in the same manner that the rod 135a is pivotally attached to the rocker 125a, and the outer or free end of this rod extends through a clearance hole in the panel 237a and is provided with a stirrup 150b. Mounted in this stirrup is an adjusting screw 151b the inner end of which cooperates with a contact finger 152b which comprises the medium speed contact. The finger 152b is riveted at its upper end to an inverted U-shaped stirrup 153b which is secured to the panel in contact with the bus bar 154, and the lower end of this finger is provided with a low resistance contact button 155b which cooperates with a low resistance contact button 156b adjustably secured to a fixed contact member 157b. The fixed contact member 157b is secured to the panel by means of a terminal post 158b, and it will be seen therefore that electrical connection with the medium speed contact can be made through the medium of the terminal posts 158b and 144. The finger 152b is biased to the position in which the contact button 155b engages the button 156b by means of a compressed coil spring 159b disposed between the panel and the finger. The rocker 125b is biased to the position in which the follower 131b engages the cam surface 116b or the stop surface 117b by means of a coil spring 147b. The parts are so proportioned and so adjusted that when the cam follower 131b is engaging the stop surface 117b the medium speed contact will be open, but that when the cam follower 131b is engaging the cam surface 116b the spring 159b will close this contact. The parts are further so proportioned that when the cam follower is opposite the stop surface the spring 147b will be strong enough to open the medium speed contact in opposition to the bias of the spring 159b.

The high speed contact is similar to the medium speed contact and is operatively connected with the rocker 125c in the same manner that the medium speed contact is operatively connected with the rocker 125b. It is believed to be unnecessary therefore to describe the high speed contact in detail.

With the contact structure constructed in the manner just described, when the cam shaft 55 is rotated in a counterclockwise direction as viewed in Fig. 10, as will be the case when the train speed is increasing, the beveled corner of each cam follower will ride smoothly up onto the cam surface and the latch will be pushed out of the way. When the cam follower has been moved to, or nearly to, its full stroke, the sharp corner of the cam follower will clear the latch and will permit the latch to return against the stop lug. When the cam shaft is rotated in the opposite direction, as is the case when the train speed is decreasing, the return of the rocker to the position in which the cam follower moves into engagement with the stop surface 117 is prevented by engagement of the lower end of the latch with the cam follower until the sharp corner of the cam follower clears the sharp corner of the latch. When this happens, the rocker will then jump due to the bias of the spring 147 which surrounds the associated rod 135 until the beveled corner of the block reaches the cam slope, whereupon smooth motion will be resumed. In effect, the latch enforces a hesitation in the return of the rocker, but after that hesitation the rocker will jump to catch up with the normal cam motion.

For the high and medium speed contacts, the latch is made long enough to barely clear the cam follower when the cam follower is fully up onto the cam surface. For these contacts the hesitation caused by the latch results in snap openings. The first small rocker motion which occurs as the cam follower moves onto the cam surface does not move the contact because clearance is provided between the push rod adjusting screw 151 and the contact arm. This clearance is adjusted by the screw. For the low speed contacts, the latch is shorter so that the cam and latch block have an appreciable return motion down the cam slope before encountering the latch. The contact opening still remaining is adjusted by shims under the stationary contact buttons. The final portion of the closing motion of the contact is with a snap action, and the push rod will clear the contact finger when the block is down on the stop surface 117 by an amount depending upon the shim adjustment.

The train speeds at which the individual contacts operate are separately adjustable by turning the cams around the cam shaft. With the contacts adjusted to operate at specific train speeds when slowing down, it will be found that they will operate at higher speeds when the train is accelerating. This speed difference is caused to a small extent by friction and to a large extent by the latch snap action. The snap action is desirable because it prevents excessive contact chattering when train speed decreases slowly to the critical operating speed.

Although we have herein shown and described only a few forms of speed responsive devices embodying our invention, it is understood that various changes and modifications may be made therein within the scope of the appended claims without departing from the spirit and scope of our invention.

Having thus described our invention, what we claim is:

1. Circuit controlling mechanism comprising a shaft mounted to oscillate, a cam segment secured to said shaft, a rocker pivotally supported adjacent said cam and provided with two rollers which are adapted to ride up onto said segment in different positions of said shaft to cause said rocker to move to one or the other of two extreme positions, said rollers being spaced apart a distance which is slightly longer than the arc of said segment, and means for controlling the angular travel of said shaft between the positions in which said rollers ride up onto said cam segment comprising a plate secured to said segment in such manner that said plate may be turned end for end and that the one end or the other of said plate will form a continuation of the arc of said segment depending on the position of said plate, said two ends being of different thicknesses, and contact mechanism controlled in accordance with the position of said rocker.

2. The combination with a cam segment, of a plate secured to said segment intermediate its ends in such manner that said plate can be turned end for end and that the one end or the other of said plate will form a continuation of the arc of said segment depending upon the position of said plate, said two ends of said plate being of different thicknesses, whereby by turning said plate end for end the length of the effective arc of said segment may be varied.

3. Circuit controlling mechanism comprising a rocker movable between two positions, means for moving said rocker, a contact finger biased to a position in which it engages a fixed contact member, and an insulating rod secured at one end to said rocker by means including an eccentric bushing rotatable to different positions and co-operating at its opposite end with said contact finger in such manner that when said rocker is moved to one of said two positions said rod will engage said finger and move it out of engagement with the associated fixed contact member an amount which depends upon the position to which said bushing is rotated.

4. Circuit controlling mechanism comprising a rocker movable between two positions, means for moving said rocker, an eccentric bushing mounted in said rocker for rotation to different positions, means for clamping said bushing in any position to which it is rotated, two insulating rods pivotally mounted at one end on a pin passing through said bushing and secured together at their free ends, an insulating panel provided with slots which guide said links at their free ends, two flexible contact fingers secured to said panel in front of the free ends of said links and biased to positions in which they engage fixed contact members secured to said panel, the parts being so proportioned that when said rocker is rotated to one of said positions said links will engage said fingers and move them out of engagement with said fixed contact members an amount which depends upon the position to which said bushing is rotated.

5. Circuit controlling mechanism comprising a rocker movable between an intermediate and two extreme positions, means for moving said rocker from its intermediate position to either extreme position, two rods pivotally attached at one end to said rocker and slidably mounted at their free ends in slots provided in an insulating panel, a pair of flexible contact fingers secured to said panel in front of the free ends of said rods and biased to positions in which they engage fixed contact members secured to said panel, means for connecting said rods together at their free ends, a screw adjustably mounted in said last mentioned means, and a third flexible contact finger secured to said panel in a position to cooperate wtih said adjusting screw and biased to a position in which it engages a fixed contact member, the parts being so proportioned that said fingers will act through said rods and said screw to bias said rocker to its intermediate position but that when said rocker is rotated to one extreme position said links will engage the fingers of said pair and move them out of engagement with the associated fixed contact members and that when said rocker is moved to its other extreme position said screw will engage said third finger and move it out of engagement with the associated fixed contact member.

6. In combination, a rocker having a fixed stroke, a contact comprising a contact finger biased into engagement with a fixed contact member, and means for operatively connecting said finger with said rocker comprising an insulting rod cooperating at one end with said finger and secured at the other end to said rocker in such manner that the effective point of connection of said rod may be varied, whereby by varying the point of connection of said rod the contact opening caused by operation of said rocker may be varied.

7. Circuit controlling mechanism comprising a cam segment rotatable between two positions, a rocker pivotally supported adjacent said cam segment and biased to one position and provided with means cooperating with said cam segment for rotating said rocker to another position in response to rotation of said cam segment from its one position toward its other position, and means cooperating with said cam segment and said rocker to cause said rocker to return to said one position with a snap action in response to rotation of said cam segment toward its one position from the position in which it moves said rocker to its other position.

8. Circuit controlling mechanism comprising a cam segment rotatable between two positions, a rocker pivotally supported adjacent said cam segment and biased to one position and provided with means cooperating with said cam segment for rotating said rocker to another position in response to rotation of said cam segment from its one position toward its other position, and means cooperating with said cam segment and said rocker to cause said rocker to return to said one position with a snap action at a different point in the stroke of said rocker from that at which it is moved to its other position.

9. Circuit controlling mechanism comprising a shaft mounted to oscillate between two extreme positions, a cam segment secured to said shaft and provided with a cam surface, a rocker pivotally supported adjacent said cam segment and biased to one position and provided with a cam follower which cooperates with said cam surface to rotate said rocker from said one position to another position in response to rotation of said shaft in one direction, and latch means secured to said cam segment and cooperating with said cam follower in a manner to prevent said rocker from returning to said one position after it has been rotated to its other position until said shaft has been rotated in the other direction to a position in which the cam surface is completely clear of said cam follower.

10. Circuit controlling mechanism comprising a shaft mounted to oscillate between two extreme positions, a cam segment secured to said shaft and provided with a cam surface, a rocker pivotally supported adjacent said cam and biased to one position and provided with a cam follower which cooperates with said cam surface to rotate said rocker from said one position to another position in response to rotation of said cam shaft in one direction, and latch means secured to said cam segment and cooperating with said cam follower in a manner to cause said rocker to return to said one position with a snap action at a different position of said shaft from that in which it is moved to its other position by engagement of said cam follower with said cam segment.

11. Circuit controlling mechanism comprising a rocker movable between two positions, an insulating panel mounted adjacent said rocker, a push rod pivotally attached at one end to said rocker and slidably mounted at the other end in said panel, a flexible contact finger secured to said panel in front of said push rod and cooperating at its lower end with a fixed contact member secured to said panel to form a contact, said fixed contact finger being biased to the position in which said contact is closed and the parts being so proportioned that movement of said rocker from its one position to its other position will cause said push rod to move said finger to a position in which said contact is open.

12. Circuit controlling mechanism comprising a cam segment rotatable between two positions, a rocker pivotally mounted adjacent said cam segment for rotation between two positions, an insulating panel mounted adjacent said rocker, a push rod pivotally connected at one end to said rocker and slidably mounted at the other end in said panel, a spring biasing said rocker to one position, means secured to said rocker and cooperating with said cam segment to at times move said rocker to its other position, and contact mechanism mounted on said panel and operated by said push rod.

13. A governor comprising a cam shaft, centrifuge means for rotating said cam shaft between two positions, a cam segment secured to said shaft, a rocker pivotally supported adjacent said cam segment and biased to one position and provided with means cooperating with said cam segment for rotating said rocker to another position in response to rotation of said shaft from its one position to its other position, means cooperating with said cam segment and said rocker to cause said rocker to return to said one position with a snap action in response to rotation of said shaft toward its one position from the position in which it moves said rocker to its other position, and a contact operated by said rocker.

14. A governor comprising a cam shaft, centrifuge means for rotating said cam shaft between two positions, a cam segment secured to said shaft, a rocker pivotally supported adjacent said cam segment and biased to one position and provided with means cooperating with said cam segment for rotating said rocker to another position in response to rotation of said shaft from its one position to its other position, means cooperating with said cam segment and said rocker to cause said rocker to return to said one position with a snap action at a different point in the stroke of said cam shaft from that in which it is moved to its other position, and a contact operated by said rocker.

15. A governor comprising a cam shaft, centrifuge means for rotating said cam shaft between two positions, a cam segment secured to said shaft, a rocker pivotally supported adjacent said cam segment and biased to one position and provided with a cam follower which cooperates with said cam segment to rotate said rocker from said one position to another position in response to rotation of said cam shaft in one direction, latch means secured to said cam segment and cooperating with said cam follower in a manner to cause said rocker to return to said one position with a snap action in response to rotation of said cam shaft in the other direction, and a contact operated by said rocker.

16. A governor comprising a cam shaft, centrifuge means for rotating said cam shaft between two positions, a cam segment secured to said shaft and provided with a cam surface, a rocker pivotally supported adjacent said cam segment and biased to one position and provided with a cam follower which cooperates with said cam surface to rotate said rocker from said one position to another position in response to rotation of said cam shaft in one direction, latch means secured to said cam segment and cooperating with said cam follower in a manner to prevent said rocker from returning to said one position after it has been rotated to its other position until said cam shaft has been rotated in the other direction to a position in which the cam surface is completely clear of said cam follower, and a contact operated by said rocker.

17. Circuit controlling mechanism comprising a cam segment rotatable between two positions, a rocker pivotally mounted adjacent said cam segment for rotation between two positions and biased to one position, a cam follower secured to said rocker and cooperating with said cam segment to rotate said rocker to its other position in response to rotation of said cam segment toward its one position, said follower being in the form of a rectangular block having a portion of one corner beveled to facilitate rotation of said rocker to its other position by engagement with said cam surface, a latch pivotally attached to said cam segment and biased to a position in which the arc of its lower surface is parallel to the cam surface of said cam segment and provided at its lower end with a notch which cooperates with said one corner beside the beveled portion, the parts being so proportioned that when said rocker is rotated to its other position by engagement with said cam surface said latch will at first engage the associated corner and will be moved away from its biased position but in the continued rotation of the segment will return to its biased position and that when said shaft is rotated in the direction to cause said cam segment to move out of engagement with said cam follower said latch will cooperate with the follower to prevent said rocker from returning to its one position until said segment has been rotated to the position in which it is past said cam follower.

18. Circuit controlling mechanism comprising a cam segment rotatable between two extreme positions, a bracket, an insulating panel secured to said bracket, a support secured to said bracket, a rocker pivotally attached to said support and provided with a roller which cooperates with said cam segment, an H-shaped push rod assembly pivotally attached at one end to said rocker and slidably mounted at the other end in slots formed in said panel, a depending stop formed on said bracket and extending between the legs of said push rod assembly in a position to cooperate with the cross member of said assembly on the side nearest said rocker, a spring interposed between said bracket and said rocker and biasing said rocker to a position in which said cross member engages said stop, a first flexible contact finger secured to said panel and extending between the legs of said push rod assembly in a position to be moved by said cross member when said rocker is rotated by engagement of said roller with said cam segment, and a second contact finger secured to said panel and engaged by said first finger when said rocker occupies the position to which it is biased by said spring but not when it is moved away from this position.

19. Circuit controlling mechanism comprising a cam segment rotatable between two extreme positions, a bracket, an insulating panel secured to said bracket, a support secured to said bracket, a rocker pivotally attached to said support and provided with a roller which cooperates with said cam segment, an H-shaped push rod assembly pivotally attached at one end to said rocker and slidably mounted at the other end in slots formed in said panel, a depending stop formed on said bracket and extending between the legs of said push rod assembly in a position to cooperate with the cross member of said assembly on the side nearest said rocker, a spring interposed between said bracket and said rocker and biasing said rocker to a position in which said cross member engages said stop, two flexible contact fingers secured to said panel on the side opposite said rocker in positions to be engaged by the ends of said push rod assembly when said roller rides up onto said cam segment and cooperating at their lower ends with fixed contact members to form contacts, and shims interposed between said support and said bracket for controlling the distance said fingers are moved by said push rod assembly.

20. Circuit controlling mechanism comprising a cam segment rotatable between two extreme positions, a bracket, an insulating panel secured to said bracket, a support secured to said bracket, a rocker pivotally attached to said support and provided with a roller which cooperates with said cam segment, an H-shaped push rod assembly pivotally attached at one end to said rocker and slidably mounted at the other end in slots formed in said panel, a depending stop formed on said bracket and extending between the legs of said push rod assembly in a position to cooperate with the cross member of said assembly on the side nearest said rocker, a spring interposed between said bracket and said rocker and biasing said rocker to a position in which said cross member engages said stop, two flexible contact fingers secured to said panel on the side opposite said rocker in position to be engaged by the ends of said push rod assembly when said roller rides up onto said cam segment and cooperating at their lower ends with fixed contact members to form contacts, a third flexible contact finger secured to said panel on the side nearest said rocker and extending between the legs of said push rod assembly in a manner to be moved by engagement with said cross member when said roller rides up onto said cam segment, a fourth finger secured to said panel and cooperating with said third finger to form a contact, and means for adjusting said fourth finger to cause said last mentioned contact to open prior to the other contacts.

21. Circuit controlling mechanism comprising a bracket, a support secured to said bracket, a rocker pivotally attached to said support, an insulating panel secured to said bracket, a push rod pivotally attached at one end to said rocker and slidably mounted at its other end in slots formed in said panel, a depending stop on said bracket, a spring interposed between said bracket and said rocker and biasing said rocker to a position in which said push rod engages said stop, means for rotating said rocker to another position, and contacts mounted on said panel and operated by said push rod.

22. Circuit controlling mechanism comprising a bracket, a support secured to said bracket, a rocker pivotally attached to said support, an insulating panel secured to said bracket, an H-shaped push rod assembly pivotally attached at one end to said rocker and slidably mounted at its other end in slots provided in said panel, a depending stop on said bracket cooperating with the cross member of said push rod assembly on the side nearest said rocker, spring means for biasing said rocker to the position in which said cross member engages said top, a first contact comprising a flexible contact finger and a cooperating adjustable contact member and operated by engagement of said finger with said cross member, and a second contact comprising a flexible contact finger and a fixed contact member and operated by engagement of the flexible finger with the end of said push rod.

23. Circuit controlling mechanism comprising a bracket, a support secured to said bracket, a rocker pivotally attached to said support, an insulating panel secured to said bracket, an H-shaped push rod assembly pivotally attached at one end to said rocker and slidably mounted at its other end in slots provided in said panel, a depending stop on said bracket cooperating with the cross member of said push rod assembly on the side nearest said rocker, spring means for biasing said rocker to the position in which said cross member engages said stop, a first contact comprising a flexible contact finger and a cooperating adjustable contact member and operated by engagement of said finger with said cross member, a second contact comprising a flexible contact finger and a fixed contact member and operated by engagement of the flexible finger with the end of said push rod, and a leaf spring clamped against said last mentioned finger to control the manner in which it flexes.

24. In combination, an insulating panel, a flexible contact finger secured to said panel, a fixed contact finger clamped between a pair of blocks secured to said panel and cooperating at one end with said flexible finger to form a contact, a screw mounted in a threaded opening provided in one of said blocks and extending with clearance through an opening formed in said fixed contact finger in such manner that rotation of said screw will move said fixed finger relative to said movable finger, a lock nut screwed onto said screw to a position to produce sufficient friction on the threads of said screw to cause said screw to remain in any position to which it is adjusted, and a leaf spring secured to said one block and provided with a slot for receiving said nut to prevent it from turning and biased by its own resiliency to the position in which said slot receives said nut.

25. In combination, an insulating panel, an insulating member slidably mounted in slots formed in said panel for movement between two positions, a first flexible contact finger secured to said panel and biased by its own resiliency into engagement with a fixed contact member secured to said panel and cooperating with said insulating member in such manner that movement of said insulating member toward its one position will move said first flexible finger out of engagement with said fixed contact member, a second flexible contact finger secured to said panel and biased by its own resiliency to a position in which it engages a relatively fixed contact finger and cooperating with said insulating member in such manner that movement of said insulating member toward its one position will move said second finger out of engagement with said relatively fixed contact finger, and means for varying the point in the stroke of said insulating member at which said second finger moves out of engagement with said fixed contact finger.

26. In combination, an insulating panel, a first contact comprising a first flexible contact finger secured to said panel and biased by its own resiliency into engagement with a fixed contact member secured to said panel, a second contact comprising a second flexible contact finger secured to said panel and biased by its own resiliency into engagement with a relatively fixed contact finger, an insulating member movable between two positions and cooperating with both said flexible contact fingers to open said contacts in response to movement of said member toward its one position, and means for adjusting the position in the stroke of said insulating member at which said second contact opens.

27. In combination, an insulating panel provided with an opening, a first contact comprising a first flexible contact finger secured to said panel in front of said opening and biased by its own resiliency into engagement with a fixed contact member secured to said panel, an insulating member slidably supported at one end in said opening for movement between two positions and cooperating with said first finger intermediate its ends in such manner that movement of said insulating member to one of its positions will cause it to move said first finger to a position in which said first contact is open, a leaf spring clamped against said first finger and extending to a point opposite said insulating member to control the manner said first finger flexes when it is being moved by said insulating member, a second contact comprising a second flexible contact finger secured to said panel on the side opposite to said first finger and biased by its own resiliency into engagement with a relatively fixed finger secured to said panel and cooperating with said insulating member in such manner that movement of said insulating member to said one position will open said second contact.

28. In combination, an insulating panel provided with an opening, a first contact comprising a flexible contact finger secured to said panel in front of said opening and biased by its own resiliency into engagement with a fixed contact member secured to said panel, an insulating member slidably supported at one end in said opening for movement between two positions and cooperating with said first finger intermediate its ends in such manner that movement of said insulating member to one of its positions will cause it to move said first finger to a position in which said first contact is open, a leaf spring clamped against said first finger and extending to a point opposite said insulating member to control the manner said first finger flexes when it is being moved by said insulating member, a second contact comprising a second flexible contact finger secured to said panel and biased by its own resiliency into engagement with a relatively fixed finger secured to said panel and cooperating with said insulating member in such manner that movement of said insulating member to said one position will open said second contact, and means for adjusting the position of said relatively fixed finger to vary the position in the stroke of said member toward said one position at which said second contact opens.

29. In combination, an insulating panel provided with an opening, a first contact comprising a flexible contact finger secured to said panel in front of said opening and biased by its own resiliency into engagement with a fixed contact member secured to said panel, an insulating member slidably supported at one end in said opening for movement between two positions and cooperating with said first finger intermediate its ends in such manner that movement of said insulating member to one of its positions will cause it to move said first finger to a position in which said first contact is open, a leaf spring clamped against said first finger and extending to a point opposite said insulating member to control the manner said first finger flexes when it is being moved by said insulating member, a second contact comprising a second flexible contact finger secured to said panel on the side opposite to said first finger and biased by its own resiliency into engagement with a relatively fixed finger clamped between a pair of blocks secured to said panel, means on said insulating member for moving said second finger out of engagement with said relatively fixed contact member to open said second contact in response to movement of said insulating member toward said one position, a screw mounted in a threaded opening provided in one of said blocks and extending with clearance through an opening formed in said fixed contact finger in such manner that rotation of said screw will move said fixed finger relative to said movable finger, a lock nut screwed onto said screw to a position to produce sufficient friction on the threads of said screw to cause said screw to remain in any position to which it is adjusted, and a leaf spring secured to said one block and provided with a slot for receiving said nut to prevent it from turning and biased by its own resiliency to the position in which said slot receives said nut.

HERBERT L. BONE.
JOHN W. LIVINGSTON.